(12) United States Patent
Haas et al.

(10) Patent No.: US 10,196,010 B2
(45) Date of Patent: Feb. 5, 2019

(54) MOLDED PART, ESPECIALLY A DECORATIVE PART AND/OR PANELING PART FOR A VEHICLE INTERIOR FASHIONED AS A MOLDED PART AND A METHOD FOR PRODUCING SUCH A MOLDED PART

(71) Applicant: Novem Car Interior Design GmbH, Vorbach (DE)

(72) Inventors: Mario Haas, Ahorntal (DE); Johann Groher, Vorbach (DE)

(73) Assignee: Novem Car Interior Design GmbH, Vorbach (DE)

( * ) Notice: Subject to any disclaimer, the term of this patent is extended or adjusted under 35 U.S.C. 154(b) by 0 days.

(21) Appl. No.: 15/658,098

(22) Filed: Jul. 24, 2017

(65) Prior Publication Data

US 2018/0022294 A1 Jan. 25, 2018

(30) Foreign Application Priority Data

Jul. 25, 2016 (DE) ........................ 10 2016 113 621

(51) Int. Cl.
*F21V 8/00* (2006.01)
*B60R 13/02* (2006.01)
(Continued)

(52) U.S. Cl.
CPC ........ *B60R 13/02* (2013.01); *B29C 45/14336* (2013.01); *B29C 45/14688* (2013.01);
(Continued)

(58) Field of Classification Search
CPC .......... B29C 2045/14696; B29C 2045/14713; B29C 45/14336; B29C 45/14688; B29C 45/372; B29C 45/1418; B29K 2075/00; B29L 2031/30; B60Q 2500/10; B60Q 3/54; B60R 13/02; B60R 2013/0287; G02B 6/001; G02B 6/3636
(Continued)

(56) References Cited

U.S. PATENT DOCUMENTS 8,016,465 B2 * 9/2011 Egerer .................... B60R 13/02
362/23.01
9,827,903 B1 * 11/2017 Salter ....................... B60Q 3/68
(Continued)

FOREIGN PATENT DOCUMENTS

| DE | 102005046934 | 2/2007 |
|---|---|---|
| DE | 102009031820 | 2/2010 |
| DE | 102009030684 | 12/2010 |
| DE | 102012105412 | 12/2013 |

*Primary Examiner* — Claude J Brown
(74) *Attorney, Agent, or Firm* — Workman Nydegger

(57) ABSTRACT

Implementations of the invention comprise a molded part, especially a decorative part and/or paneling part for a vehicle interior fashioned as a molded part, comprising a backing, especially a plastic backing, and a decorative layer, especially a wood veneer, wherein the decorative layer has a rear side facing the backing and a front side designed as a visible side, wherein at least one light source, especially a laser or a LED designed as the light source, is provided on or in the molded part. Implementations of the present invention also comprise a method for producing a molded part according to the invention.

12 Claims, 1 Drawing Sheet

(51) Int. Cl.
*B60Q 3/54* (2017.01)
*B29C 45/14* (2006.01)
*B29C 45/37* (2006.01)
*B29K 75/00* (2006.01)
*B29L 31/30* (2006.01)
*G02B 6/36* (2006.01)

(52) U.S. Cl.
CPC .............. *B29C 45/372* (2013.01); *B60Q 3/54* (2017.02); *G02B 6/001* (2013.01); *B29C 45/1418* (2013.01); *B29C 2045/14696* (2013.01); *B29C 2045/14713* (2013.01); *B29K 2075/00* (2013.01); *B29L 2031/30* (2013.01); *B60Q 2500/10* (2013.01); *B60R 2013/0287* (2013.01); *G02B 6/3636* (2013.01)

(58) Field of Classification Search
USPC ........................................................ 362/511
See application file for complete search history.

(56) References Cited

U.S. PATENT DOCUMENTS

| | | | |
|---|---|---|---|
| 2009/0324901 A1* | 12/2009 | Hashiba | B29C 51/002 428/195.1 |
| 2012/0032592 A1* | 2/2012 | Breunig | B29C 45/1643 315/77 |
| 2013/0148373 A1* | 6/2013 | Bayersdorfer | G02B 6/001 362/511 |
| 2015/0274066 A1* | 10/2015 | Del Pozo Gonzalez | B60R 13/02 362/551 |
| 2016/0082881 A1* | 3/2016 | Yamato | B60Q 3/217 362/511 |
| 2017/0128742 A1* | 5/2017 | Rabiner | A61M 25/10 |
| 2017/0217366 A1* | 8/2017 | Kraemer | B60Q 3/64 |
| 2017/0312958 A1* | 11/2017 | Wegner | B29C 45/14688 |

\* cited by examiner

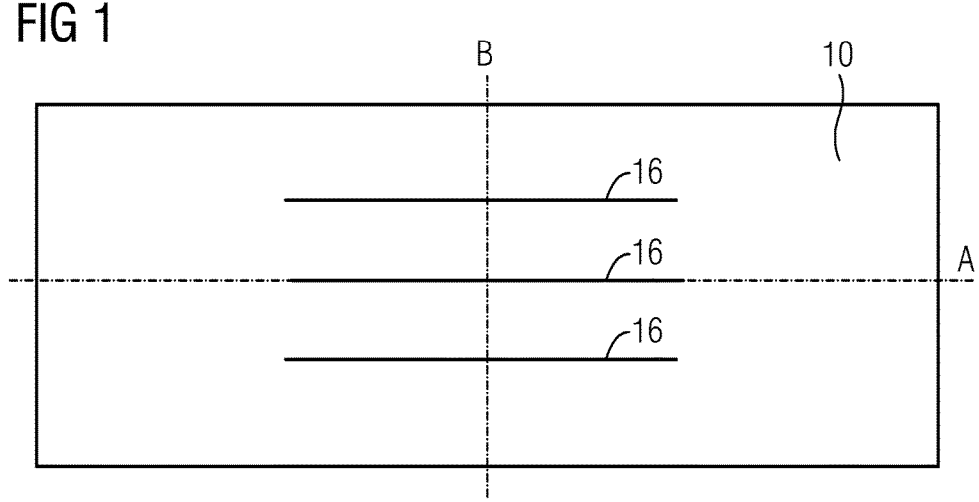
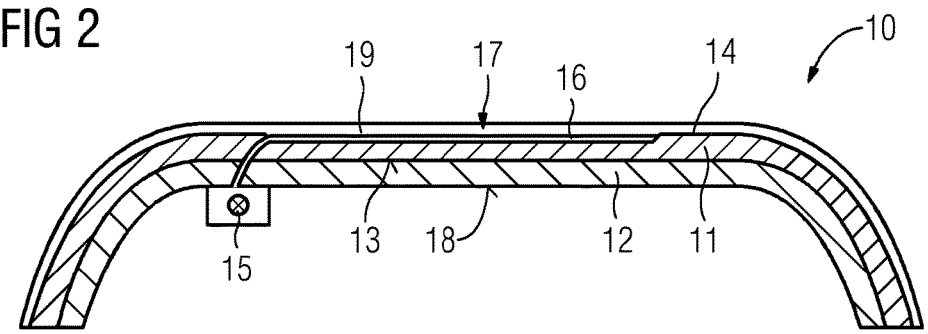
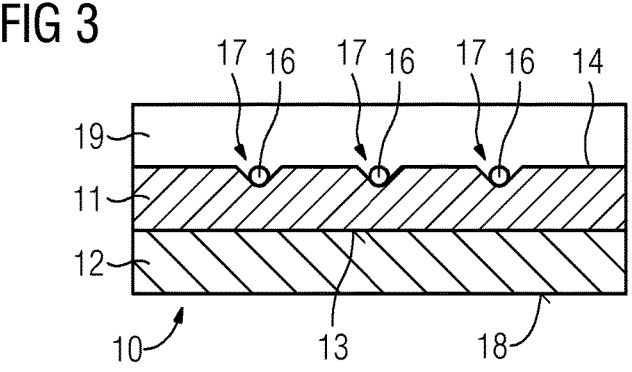

MOLDED PART, ESPECIALLY A DECORATIVE PART AND/OR PANELING PART FOR A VEHICLE INTERIOR FASHIONED AS A MOLDED PART AND A METHOD FOR PRODUCING SUCH A MOLDED PART

CROSS-REFERENCE TO RELATED APPLICATIONS

The present invention claims priority to German Patent Application No. DE 102016113621.2 filed Jul. 25, 2016, the entire content of which is incorporated herein by reference.

BACKGROUND OF THE INVENTION

1. The Field of the Invention

The invention relates to a molded part, especially a decorative part and/or paneling part for a vehicle interior fashioned as a molded part.

2. Background and Relevant Art

Such molded parts comprise a backing, especially a plastic backing, and a decorative layer, especially a wood veneer, wherein the decorative layer has a rear side facing the backing and a front side designed as a visible side, wherein at least one light source, especially a laser or a LED designed as the light source, is provided on or in the molded part.

In the case of such molded parts, there is always a demand for new and attractive light effects to implement light designs and/or representations of symbols on the molded part's front side. However, most of the known solutions come with the drawback of having a high cost of the component and/or the manufacturing process.

Thus, the problem which the invention proposes to solve is to indicate a new molded part, especially a molded part with new light effects on the molded part's front side. Moreover, the problem which the invention proposes to solve is to indicate a new method for the manufacturing of such a molded part.

This problem is solved in regard to the molded part by the features of claim 1 and in regard to the method for manufacturing such a molded part by the features of claim 9. Advantageous embodiments and modifications are indicated in the respective dependent claims.

BRIEF SUMMARY OF THE INVENTION

The molded part according to the invention is wherein one or more side lighting fibers connected to the light source are provided on the front side of the decorative layer, designed as the visible side, and the side lighting fiber or side lighting fibers run at least for a section in parallel with the front side of the decorative layer in one or more grooves provided in the front side of the decorative layer to accommodate the side lighting fiber or side lighting fibers.

By side lighting fibers it is meant in particular optical fibers which give off light not only at their fiber end, but also sideways along the longitudinal extension of the fibers. Thus, the side lighting fibers serve not only to transport light, but also they are themselves a lighting element giving off light sideways along their longitudinal extension.

In the molded part according to the invention, the optical fiber or fibers are provided in particular to give off light on the front side of the decorative layer, designed as the visible side, for example, in order to create a lighting accent of straight or wavy shape or also to represent a symbol.

The advantages of the invention lie in particular in that precise and form-following luminous line designs, so-called "flowing lines", can be represented on the front side of the decorative layer.

DETAILED DESCRIPTION OF THE INVENTION

According to one modification of the invention, the at least one light source is provided at the rear side of the molded part or in a recess in the backing or at the side on the molded part, wherein the side lighting fiber or side lighting fibers are led backwards through the molded part or sideways out from the molded part at least at one of its respective ends for the connection with the light source.

Preferably, the side lighting fiber is or comprises or the side lighting fibers are or comprise polymer optical fibers and/or glass fibers, especially quartz glass fibers.

It may be provided that the groove or the grooves extend into the decorative layer or entirely through the decorative layer, especially as far as the backing, preferably orthogonally to the front side of the decorative layer.

For example, the groove or the grooves are fashioned half-round or parabolic or rectangular in cross-section.

According to one expedient and preferred variant embodiment of the invention, a transparent or translucent protective and/or optical layer is provided on the front side of the decorative layer, especially one made of polyurethane (PUR). Preferably, this protective and/or optical layer also covers the side lighting fiber or side lighting fibers and moreover preferably fills any spaces remaining between the groove or grooves and their respectively associated side lighting fibers. Preferably, the side lighting fiber is or the side lighting fibers are entirely embedded in the protective and/or optical layer (except for contact sites with the decorative layer and/or backing and possibly except for the adhesive used for the bonding).

Preferably, the side lighting fiber or side lighting fibers are bonded and/or press-fitted into the groove or grooves. In particular, the cross-section dimensions of side lighting fiber and groove are respectively adapted to each other for this.

The side lighting fiber or side lighting fibers or a partial set of the side lighting fibers may have a colored jacketing.

The method according to the invention for producing a molded part according to the invention comprises the steps: providing of a material intended to form the decorative layer of the molded part, back injection of the material designed to form the decorative layer by means of injection molding with a backing material, especially a plastic, to form the backing, forming of at least one or more grooves on the front side of the decorative layer, inserting of one or more side lighting fibers into the groove or into the grooves.

According to one modification of the method, it is provided that the side lighting fiber or side lighting fibers are introduced by bonding and/or press fitting into the groove or grooves.

Moreover, it may be provided that a transparent or translucent protective and/or optical layer is provided, especially by depositing or casting, on the front side of the decorative layer, especially one made of PUR.

Preferably, the groove or grooves are milled or embossed, preferably by the top mold of an injection molding die.

The invention shall now be explained more closely, also in regard to further features and advantages, with the aid of the description of exemplary embodiments and making reference to the enclosed schematic drawings.

BRIEF DESCRIPTION OF FIGURES

FIG. 1 shows in a schematic representation, a top view of a first exemplary embodiment of a molded part according to the invention, FIG. 2 shows in a schematic cross-sectional representation, a second exemplary embodiment of a molded part according to the invention, for example along a sectioning plane as represented in FIG. 1 by the sectioning line A, and FIG. 3 shows in a schematic cross-sectional representation, a third exemplary embodiment of a molded part according to the invention, for example along a sectioning plane as represented in FIG. 1 by the sectioning line B.

Mutually corresponding parts and components are designated each time with the same reference signs, even among the different exemplary embodiments.

DETAILED DESCRIPTION OF THE PREFERRED EMBODIMENTS

FIG. 1 to FIG. 3 show a decorative part and/or paneling part for a vehicle interior fashioned as a molded part 10, comprising a plastic backing 12 and a wood veneer designed as the decorative layer 11. The decorative layer 11 has a rear side 13 facing the backing 12 and a front side 14 fashioned as the visible side. On the rear side of the molded part 10 there is provided a laser as the light source 15.

There are three side lighting fibers 16 connected to the light source 15 provided on the front side 14 of the decorative layer 11 designed as the visible side. The side lighting fibers 16 run in sections in parallel with the front side 14 of the decorative layer 11 in three grooves 17 in the front side 14 of the decorative layer 11, designed to accommodate the side lighting fibers 16.

The side lighting fibers 16 are led at one of their respective ends for connection to the light source 15 backward through the molded part 10, as can be seen in FIG. 2.

The side lighting fibers 16 may be polymer optical fibers or glass fibers, especially quartz glass fibers. These are bonded or press-fitted in the grooves 17. The side lighting fibers 16 or some of the side lighting fibers 16 may have a colored jacketing.

The grooves 17 extend orthogonally to the front side 14 of the decorative layer 11 into the decorative layer 11 and are parabola-shaped in cross-section, as can be seen in FIG. 3. The grooves 17 are milled into the front side 14 of the decorative layer 11.

FIG. 2 and FIG. 3 show that a transparent protective and/or optical layer 19 of polyurethane (PUR) is cast on the front side 14 of the decorative layer 11.

LIST OF REFERENCES

10 Molded part
11 Decorative Layer
12 Backing
13 Rear Side
14 Front Side
15 Light Source
16 Side lighting fiber
17 Groove
18 Molded-part's rear side
19 Protective and/or optical layer
A Sectioning Line
B Sectioning Line

We claim:

1. A molded part, in the form of a decorative part and/or paneling part for a vehicle interior fashioned, comprising:
  a backing, and a wood veneer forming a decorative layer, wherein:
  the decorative layer has a rear side facing the backing and a front side forming a visible side,
  at least one light source, comprising a laser or a LED, is disposed on or in the molded part,
  one or more side lighting fibers connected to the light source are disposed on the front side of the decorative layer, which forms the visible side,
  the side lighting fiber or side lighting fibers run at least for a section in parallel with the front side of the decorative layer in one or more grooves disposed in the front side of the decorative layer to accommodate the side lighting fiber or side lighting fibers; and
  the groove or grooves are milled or embossed on the front side of the decorative layer.

2. The molded part as claimed in claim 1, wherein:
  the at least one light source is disposed at the rear side of the molded part or in a recess in the backing or at the side on the molded part, and
  the side lighting fiber or side lighting fibers are led backwards through the molded part or sideways out from the molded part at least at one of its respective ends for the connection with the light source.

3. The molded part as claimed in claim 1, wherein:
  the side lighting fiber or side lighting fibers comprise polymer optical fibers and/or glass fibers comprising quartz glass fibers.

4. The molded part as claimed in claim 1, wherein:
  the groove or the grooves extend into the decorative layer or entirely through the decorative layer as far as the backing and orthogonally to the front side of the decorative layer.

5. The molded part as claimed in claim 1, wherein:
  the groove or the grooves are fashioned half-round or parabolic or rectangular in cross-section.

6. The molded part as claimed in claim 1, wherein
  a transparent or translucent protective and/or optical layer is provided on the front side of the decorative layer, wherein the transparent or translucent protective and/or optical layer is one made of polyurethane ("PUR").

7. The molded part as claimed in claim 1, wherein:
  the side lighting fiber or side lighting fibers are bonded and/or press-fitted into the groove or grooves.

8. The molded part as claimed in claim 1, wherein:
  the side lighting fiber or side lighting fibers or a partial set of the side lighting fibers have a colored jacketing.

9. A method for producing a molded part as claimed in claim 1, comprising the steps:
  providing of a material intended to form the decorative layer of the molded part,
  back injection of the material designed to form the decorative layer by means of injection molding with a backing material comprising a plastic, to form the backing,
  forming of at least one or more grooves on the front side of the decorative layer,
  inserting of one or more side lighting fibers into the groove or into the grooves.

10. The method as claimed in claim 9, wherein:
  the side lighting fiber or side lighting fibers are introduced by bonding and/or press-fitting into the groove or grooves.

11. The method as claimed in claim 9, wherein:
a transparent or translucent protective and/or optical layer is deposited or cast on the front side of the decorative layer, wherein the transparent or translucent protective and/or optical layer is made of PUR.

12. The method as claimed in claim 9, wherein:
the groove or grooves are milled on the front side of the decorative layer, or embossed by the top mold of an injection molding die.

\* \* \* \* \*